(12) United States Patent
Alaman Aguilar et al.

(10) Patent No.: US 8,982,080 B2
(45) Date of Patent: Mar. 17, 2015

(54) DOMESTIC APPLIANCE OPERATING DEVICE

(75) Inventors: Jorge Alaman Aguilar, Saragossa (ES); Miguel Angel Buñuel Magdalena, Saragossa (ES); Diego Cuartielles Ruiz, Lenting (DE); Francisco Javier Ester Sola, Saragossa (ES); Jose Ramon Garcia Jimenez, Friedberg (ES); Pablo Jesus Hernandez Blasco, Cuarte de Huerva (ES); Sergio Llorente Gil, Saragossa (ES); Alfonso Lorente Perez, Saragossa (ES); Oscar Lucia Gil, Saragossa (ES); Carlos Vicente Mairal Serrano, Saragossa (ES); Henry Mauricio Mantilla Chacón, Saragossa (ES); Arturo Mediano Heredia, Saragossa (ES); Jose Joaquin Paricio Azcona, Saragossa (ES); Pilar Perez Cabeza, Saragossa (ES); Fernando Planas Layunta, Saragossa (ES); Julio Rivera Peman, Cuarte de Huerva (ES)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 167 days.

(21) Appl. No.: 13/817,595

(22) PCT Filed: Aug. 26, 2011

(86) PCT No.: PCT/IB2011/053755
§ 371 (c)(1),
(2), (4) Date: Feb. 19, 2013

(87) PCT Pub. No.: WO2012/032432
PCT Pub. Date: Mar. 15, 2012

(65) Prior Publication Data
US 2013/0147751 A1    Jun. 13, 2013

(30) Foreign Application Priority Data
Sep. 10, 2010  (ES) .................................. 201031350

(51) Int. Cl.
G06F 3/041 (2006.01)
F24C 7/08 (2006.01)

(52) U.S. Cl.
CPC ................ *G06F 3/041* (2013.01); *F24C 7/083* (2013.01); *F24C 7/086* (2013.01)
USPC ........................................................ 345/173

(58) Field of Classification Search
CPC ........ H03K 17/96; H05B 6/12; G06F 3/0488; G06F 3/048; G06F 3/04886; G06F 3/045
USPC ........................................................ 345/173
See application file for complete search history.

(56) References Cited

U.S. PATENT DOCUMENTS

| 5,760,715 | A | 6/1998 | Senk et al. | |
| 7,428,191 | B1* | 9/2008 | Klein | 368/82 |
| 7,763,832 | B2 | 7/2010 | Striegler et al. | |
| 2005/0078027 | A1* | 4/2005 | Philipp | 341/173 |

(Continued)

FOREIGN PATENT DOCUMENTS

| CN | 201377830 Y | 1/2010 |
| CN | 201555273 U | 8/2010 |

(Continued)

OTHER PUBLICATIONS

International Search Report PCT/IB2011/053755 dated Jan. 11, 2012.

(Continued)

*Primary Examiner* — Aneeta Yodichkas
(74) *Attorney, Agent, or Firm* — James E. Howard; Andre Pallapies

(57) ABSTRACT

A domestic-appliance-operating device, in particular a hob-operating device, includes an operating panel having a touch operating surface, a sensor plate which is arranged beneath the touch operating surface, and a touch sensor unit. A signal-transmission unit connects the sensor plate to the touch sensor unit in an electrically conductive manner by a conducting element and has at least one screening unit.

25 Claims, 2 Drawing Sheets

(56) References Cited

U.S. PATENT DOCUMENTS

2009/0261088 A1* 10/2009 Isoda et al. .................. 219/489
2010/0078304 A1* 4/2010 Kaps et al. .................. 200/600
2010/0096248 A1* 4/2010 Yamauchi et al. ............ 200/600

FOREIGN PATENT DOCUMENTS

| | | | |
|---|---|---|---|
| DE | 102008041517 A1 | 3/2010 | |
| EP | 0780981 B1 | 4/2002 | |
| EP | 1953915 A2 | 8/2008 | |
| JP | WO/2008/096639 | * | 8/2008 |

OTHER PUBLICATIONS

Report of Examination including National Search Report CN 201180043626 dated Sep. 3, 2014.

* cited by examiner the operating panel above the conducting element should in particular be taken to mean an area of the operating panel which comprises the touch operating surface and which lies opposite the conducting element relative to the operating panel.

DOMESTIC APPLIANCE OPERATING DEVICE

CROSS-REFERENCE TO RELATED APPLICATIONS

This application claims priority under 35 U.S.C. 371 of International Application No. PCT/IB2011/053755, filed Aug. 26, 2011, which claims priority under 35 U.S.C. 119 of ES Application No. P201031350, filed Sep. 9, 2010.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

SEQUENCE LISTING

Not Applicable

BACKGROUND OF THE INVENTION

The invention is directed to a domestic-appliance-operating device.

The publication DE 10 2008 041 517 A1 discloses a domestic-appliance-operating device having a touch operating surface on the top side of an electrically insulating operating panel. A conductive coating is applied in a silk screen process to an underside of the operating panel, and forms a sensor plate arranged beneath the touch operating surface and a conducting element, which connects the sensor plate to a touch sensor unit in an electrically conductive manner.

BRIEF SUMMARY OF THE INVENTION

The object of the invention is, in particular, to create a generic domestic-appliance-operating device which has improved properties in respect of a flexible design.

The object is achieved according to the invention by a domestic-appliance-operating device, in particular a hob-operating device, having an operating panel which comprises a touch operating surface, a sensor plate which is arranged beneath the touch operating surface, and a signal-transmission unit, which connects the sensor plate to a touch sensor unit in an electrically conductive manner by means of a conducting element. Advantageous embodiments and developments of the invention can be taken from the subclaims.

It is proposed that the signal-transmission unit has at least one screening unit. "Provided" should in particular be taken to mean specially programmed, construed and/or equipped. An "operating panel" should in particular be taken to mean a side of a domestic appliance which can be touched by an operator in an assembled condition, in particular a hob plate of a hob, having a section which forms a touch operating surface. Preferably the operating panel at least partially comprises an electrically insulating material, in particular glass ceramic. Particularly advantageously, the section forming the touch operating surface of the operating panel comprises an electrically insulating material, in particular glass ceramic. "Electrically insulating" should be taken to mean, in particular, with a specific electrical resistance of at least $10^8$ Ωm, in particular, at least $10^{10}$ Ωm and advantageously at least $10^{12}$ Ωm at 20° C. A "touch operating surface" should be taken to mean in particular a surface area of the operating panel forming an operating element, which can be activated, in particular without displacement, by means of touch. "Activation" of an operating element should in particular be taken to mean the performance of an operating procedure or part of an operating procedure with the aid of the operating element. Preferably the section of the operating panel forming the touch operating surface is provided with markings on a first side of the operating panel facing an operator. A "sensor plate" should be taken to mean in particular an electrically conductive plate which forms an electrode and is connected to a touch sensor unit in an electrically conductive manner. Preferably the sensor plate has at least one recess. "In an electrically conductive manner" should in particular be taken to mean with a specific electrical resistance of at most $10^{-4}$ Ωm, in particular $10^{-5}$ Ωm maximum and advantageously at most $10^{-6}$ Ωm at 20° C. That the sensor plate is arranged "beneath" the touch operating surface should in particular also be taken to mean that the sensor plate is arranged on a second side of the operating panel facing the first side, in particular is arranged directly and preferably fastened. In particular, when looking perpendicularly at the touch operating surface an external contour line of the sensor plate encloses an external contour line of the touch operating surface completely. Preferably when looking perpendicularly at the touch operating surface, the external contour lines of the sensor plate and touch operating surface coincide. A "signal-transmission unit" should in particular be taken to mean a unit comprising at least one conducting element which connects the sensor plate to the touch sensor unit in an electrically conductive manner. A "touch sensor unit" should in particular be taken to mean an electronic unit which is connected to a sensor plate in an electrically conductive manner and which is designed to electrically charge the sensor plate and to detect a change in an electrical field originating from the sensor plate. Preferably the touch sensor unit is connected to a control and/or regulation unit of the domestic appliance and is designed for the input of at least one operating parameter of the domestic appliance. That the sensor plate is connected to a touch sensor unit "in an electrically conductive manner" by means of the conducting element should in particular also be taken to mean that an electrically conductive connection exists between the sensor plate and the touch sensor unit comprising the conducting element. A "screening unit" of the signal-transmission unit should be taken to mean in particular a unit differing from an electronics board and/or the operating panel, which is provided to prevent at least major influencing of an electrical field originating from the conducting element when an area of the operating panel above the conducting element is contacted. "Major influencing" of the electrical field originating from the conducting element should in particular be taken to mean a change in the electrical field which is recorded as a triggering event by the touch sensor unit. The area of the operating panel above the conducting element can be contacted by an operator and/or a cooking utensil and/or any other object.

When the touch operating surface is operating reliably, a space can be made between the sensor plate and the touch sensor unit by means of such an embodiment. In particular, the touch operating elements can be positioned in particularly suitable sections of the operating panel by this means. In addition, various operating panels can be created with various arrangements of touch operating surfaces, in which an arrangement of the touch sensor units is identical and which only differ through an arrangement of the sensor plates and through an embodiment of the signal-transmission unit. In addition, a commercially available touch sensor unit can be used. On the one hand, this enables an advantageously more flexible design and on the other hand, a reduction in assembly effort and a reduction of costs. In particular, if the signal-transmission unit has coatings on the operating panel, a variation for various embodiments of the operating panel can be undertaken particularly easily and inexpensively. In addition, in the case of cooking appliances or hobs in particular, the touch operating surface and the associated signal surface can be provided in a surface area of the operating panel which has a temperature in excess of an upper temperature limit permissible for the reliable operation of the signal unit. By this means an advantageous proximity of a cooking zone of a hob and of a touch operating surface can be achieved.

Advantageously the sensor plate and the touch sensor unit are spaced well apart. That the sensor plate and the touch sensor unit are "spaced well apart" should in particular be taken to mean that a distance between the sensor plate and the touch sensor unit on a parallel plane to the operating panel is at least 2 times, in particular, 5 times, advantageously 10 times and particularly advantageously 20 times as great as a maximum extension length of the sensor plate on the plane. A "distance between the sensor plate and the touch sensor unit on a parallel plane to the operating panel" should in the case of a projection of the sensor plate and the touch sensor unit onto the operating panel in particular be taken to mean the smallest distance between the contour line of the sensor plate and a contour line of the touch sensor unit. A "maximum extension length of the sensor plate on the plane" should in the case of a projection of the sensor plate onto the operating panel in particular be taken to mean a maximum distance between two boundary points of the contour line of the sensor plate. By this means an advantageous increase in the ease of use can be made possible as the touch operating surface can be arranged in a section of the operating panel which is excluded for the touch sensor unit, in particular by an elevated temperature. In addition, a reduction in costs can be achieved as various embodiments of an operating panel with a touch operating surface can be obtained which only differ as a result of the positioning of a sensor plate and as a result of an embodiment of a signal-transmission unit.

Furthermore, it is proposed that the sensor plate and the conducting element are designed in one piece as a conductive coating. That the sensor plate and the conducting element are designed "in one piece as a conductive coating" should in particular be taken to mean that the sensor plate and the conducting element form a coherent, electrically conductive coating on a substrate. Preferably the sensor plate and the conducting element were applied in a single coating process. Preferably the conductive coating is applied directly to the second side of the operating panel and/or to an additional coating on the second side of the operating panel.

By means of this embodiment a reliable contacting of the sensor plate with the operating panel can be obtained. Furthermore, particularly reliable electrical contacting can be created between the sensor plate and the conducting element, resulting in particular space-saving. Preferably, the conductive coating is at least 30 μm thick, in particular, at least 50 μm, advantageously at least 70 μm and particularly advantageously at least 90 μm. As a result, sufficiently high electrical conductivity of the coating can be achieved. Preferably, the conductive coating is at most 200 μm thick, in particular 170 μm maximum, advantageously at most 140 μm and particularly advantageously 110 μm maximum. As a result, material can be saved and the time required for production reduced. Preferably the conductive coating is applied to the substrate by means of a cathode sputtering method and consists in particular of pure metals. As a result, the operating panel can be coated at a low temperature, which counteracts possible damage to and/or impairment of the stability of the operating panel. Preferably the conductive coating is made of a paste-like suspension which has at least finely distributed metal particles, in particular in the form of powder and/or flakes and/or film and/or strips, an inorganic carrier material to bind the coating to the substrate, in particular a glass frit, and a binding agent, in particular diethylene glycol and/or a diethylene glycol monobutyl ether, and which is preferably applied to the substrate by means of a silk screen process. The metal particles constitute at least 5%, in particular at least 30%, preferably at least 50% and particularly advantageously at least 80% and advantageously at most 95% of a maximum mass of the suspension and preferably comprise precious metals, in particular gold and/or silver and/or platinum and/or palladium, and/or alloys of precious metals and/or nickel and/or copper and/or aluminum and/or cobalt and/or iron and/or bismuth. Preferably the suspension is sintered at a temperature of between 600° C. and 700° C. after application to the substrate, wherein the binder evaporates and/or is burned up. Production costs can be reduced as result of this.

In a preferred embodiment it is proposed that the screening unit comprises at least one electrically conductive element connected to a reference voltage terminal, which is provided to shield an electrical field of the conducting element. In particular, the electrically conductive element is an electrically conductive coating, preferably on the second side of the operating panel. That the electrically conductive element is provided to shield the electrical field of the conducting element should in particular be taken to mean that the electrically conductive element is provided to prevent at least major influencing of an electrical field originating from the conducting element when an area of the operating panel above the conducting element is contacted. A "reference voltage terminal" should in particular be taken to mean an electrical connection with a constant electrical potential. By means of such an embodiment major influencing of an electrical field originating from the conducting element can be prevented when an area of the operating panel above the conducting element is contacted, as electrical charges from the electrically conductive element can be dissipated.

In a particularly preferred embodiment it is proposed that the reference voltage terminal is an earth terminal. Preferably the earth terminal is a protective earth terminal and particularly advantageously a functional earth terminal. This enables a particularly simple and advantageous shielding of the conducting element.

Particularly advantageously the electrically conductive element is arranged in a parallel direction to the touch operating surface at least partially on the side adjacent to the conducting element. That "the electrically conductive element is arranged in a parallel direction to the touch operating surface at least partially on the side adjacent to the conducting element" should in particular be taken to mean that at least one plane parallel to the touch operating surface intersects the conducting element and the electrically conductive element. As a result of this, a particularly simple shielding of the conducting element can be achieved, as an electrically insulating element between the conducting element and the electrically conductive element can be dispensed with.

In a further embodiment of the invention it is proposed that the electrically conductive element is arranged at least partially between the conducting element and the operating panel. That "the element is arranged at least partially between the conducting element and the operating panel" should in particular be taken to mean that at least one straight line perpendicular to the touch operating surface intersects the conducting element and the electrically conductive element. As a result of this a particularly effective shielding of the conducting element can be achieved. Preferably the conducting element has recesses. As a result of these, material can be saved and costs can be reduced.

In addition, it is proposed that the screening unit comprises at least one dielectric element which is designed to electrically shield the conducting element. A "dielectric element" should in particular be taken to mean an electrically insulating element which leads to a weakening of an electrical field as a result of dielectric polarization. That the dielectric element is provided "to electrically shield the conducting element" should in particular be taken to mean that the dielectric element electrically insulates the conducting element from other components, in particular from the electrically conductive element, and/or prevents major influencing of an electrical field originating from the conducting element when an area of the operating panel above the conducting element is contacted. Advantageously the dielectric element has a specific electrical resistance which is in the same order of magnitude as a specific electrical resistance of the operating panel. In addition, the dielectric element preferably has a dielectric constant which is greater than a dielectric constant of the operating panel. As a result of this, additional advantageous embodiments of the domestic-appliance-operating device can be made possible. Preferably the dielectric element is embodied as an electrically insulating coating, in particular, a ceramic coating and particularly advantageously enamel. Production costs can be reduced as a result of this. Preferably the insulating coating is at least 30 μm thick, in particular, at least 50 μm, advantageously at least 70 μm and particularly advantageously at least 100 μm. As a result of this, sufficiently high shielding can be achieved. Preferably the insulating coating is at most 200 μm thick, in particular 170 μm maximum, advantageously at most 140 μm and particularly advantageously 110 μm maximum. As a result of this material can be saved and the time required for production reduced. Preferably the dielectric element is inserted between the conducting element and the electrically conductive element connected to the reference voltage terminal. By this means electrical insulation can be provided between the conducting element and the electrically conductive element.

In a further embodiment of the invention it is proposed that the dielectric element is arranged at least partially between the conducting element and the operating panel. That the "dielectric element is arranged at least partially between the conducting element and the operating panel" should in particular be taken to mean that at least one straight line perpendicular to the touch operating surface intersects the conducting element and the dielectric element. Preferably the dielectric element is in direct contact with the conducting element and/or the operating panel. As a result of this, when a surface area of the operating panel above the conductor is contacted, an attenuation of an influence on the electrical field can be achieved.

In a preferred embodiment it is proposed that the signal-transmission unit comprises a spring element which is designed to connect the conducting element to the touch sensor unit in an electrically conductive manner. A "spring element" should in particular be taken to mean an elastic element which in an assembled state, preferably with a bias, is arranged between the conducting element and the touch sensor unit. Preferably the spring element consists of an electrically conductive material. Preferably the spring element is a conductive rubber, a metallic helical spring or a metallic leaf spring. By this means reliable electrical contacting of the conducting element can be achieved with the touch sensor unit.

The domestic-appliance-operating device according to the invention is suitable for all domestic appliances deemed appropriate by a person skilled in the art, such as in particular cooking appliances, refrigerators, dishwashers, etc., and particularly advantageously hobs.

Additional advantages emerge from the following illustrated descriptions. The figures show three exemplary embodiments of the invention. The figures, the descriptions and the claims contain numerous features in combination. For reasons of expediency the person skilled in the art will also examine the features individually and combine them to make appropriate additional combinations.

BRIEF DESCRIPTION OF THE DRAWINGS

The figures show.

DETAILED DESCRIPTION OF EXEMPLARY EMBODIMENTS OF THE PRESENT INVENTION

Figure 1:
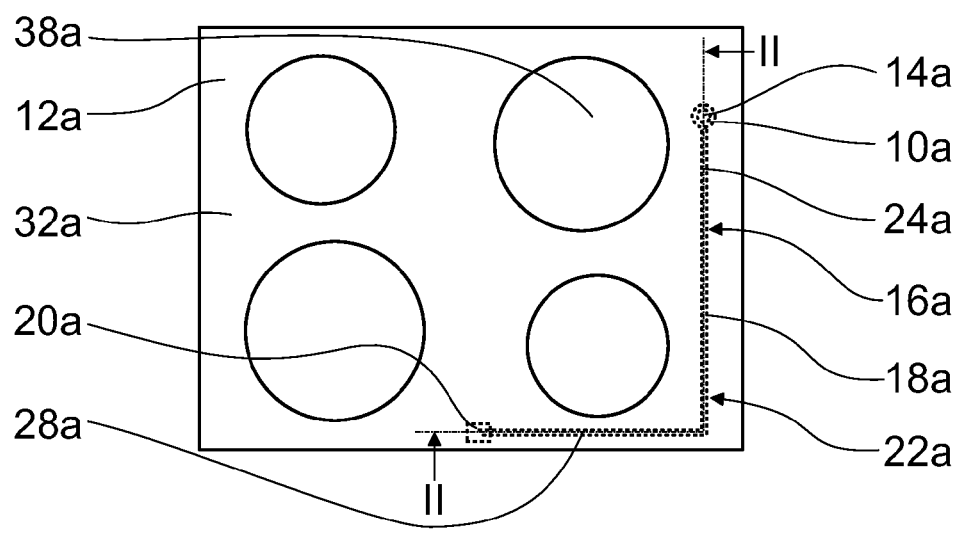
FIG. 1 A glass ceramic hob with a domestic-appliance-operating device according to the invention in a plan view,
FIG. 2 The domestic-appliance-operating device from FIG. 1 with a screening unit comprising a dielectric element in a cross-section which is not true to scale along a line II-II in FIG. 1,
FIG. 3 A domestic-appliance-operating device in a cross-section not true to scale with a screening unit which comprises a dielectric element and an electrically conductive element,
FIG. 4a An additional domestic-appliance-operating device in a cross-section not true to scale with a screening unit which comprises an electrically conductive element,
FIG. 4b The domestic-appliance-operating device from FIG. 4a with the hob plate removed in a plan view which is not true to scale.

FIG. 1 shows a plan view of a glass ceramic hob with a domestic-appliance-operating device according to the invention. The glass ceramic hob comprises a glass ceramic hob plate 32a which forms an operating panel 12a of the domestic-appliance-operating device. The operating panel 12a has a section which depicts a touch operating surface 10a and which can be touched by an operator. The touch operating surface 10a is marked by known means by a ceramic coating on a top side of the operating panel 12a facing the operator when the glass ceramic hob is ready for operation. The touch operating surface 10a is designed to be activated by the touch of a finger 34a. In the present case the touch operating surface 10a is provided to switch a cooking zone 38a of the hob plate 32a adjacent to the touch operating surface 10a on or off and to select a heating capacity setting. To this end the domestic-appliance-operating device has a sensor plate 14a beneath the operating panel 12a which has an identical external contour to the touch operating surface 10a when looking at the touch operating surface 10a perpendicularly. The sensor plate 14a is arranged directly beneath the touch operating surface 10a when the glass ceramic hob is ready for operation. The sensor plate 14a is like a flat disk ring (cf. sensor plate 14c in FIG. 4b). The sensor plate 14a is connected in an electrically conductive manner by means of a conducting element 18a of a signal-transmission unit 16a to a touch sensor unit 20a spaced well apart from the sensor plate 14a. The touch sensor unit 20a is provided to register a change in an electrical field 40a originating from the sensor plate 14a (cf. FIG. 2). In order to ensure reliable, electrically conductive contacting of the touch sensor unit 20a with the conducting element 18a of the signal-transmission unit 16a, the signal-transmission unit 16a comprises an elastic spring element 30a which is arranged with a bias between the conducting element 18a and a contact point of the touch sensor unit 20a. The spring element 30a is made of conductive rubber. Alternatively the spring element 30a can also be made of a helical spring and/or leaf spring and/or any elastic element deemed appropriate by a person skilled in the art. In order to ensure that only the touch of a finger 34a in the area of the touch operating surface 10a is detected as an activation of the touch operating surface 10a, the signal-transmission unit 16a comprises a screening unit 22a. The screening unit 22a prevents touching of the operating panel 12a with a finger 36a in an area above the conducting element 18a leading to major influencing of an electrical field originating from the conducting element 18a which is detected by the touch sensor unit 20a as an activation of the touch operating surface 10a.

Figure 2:
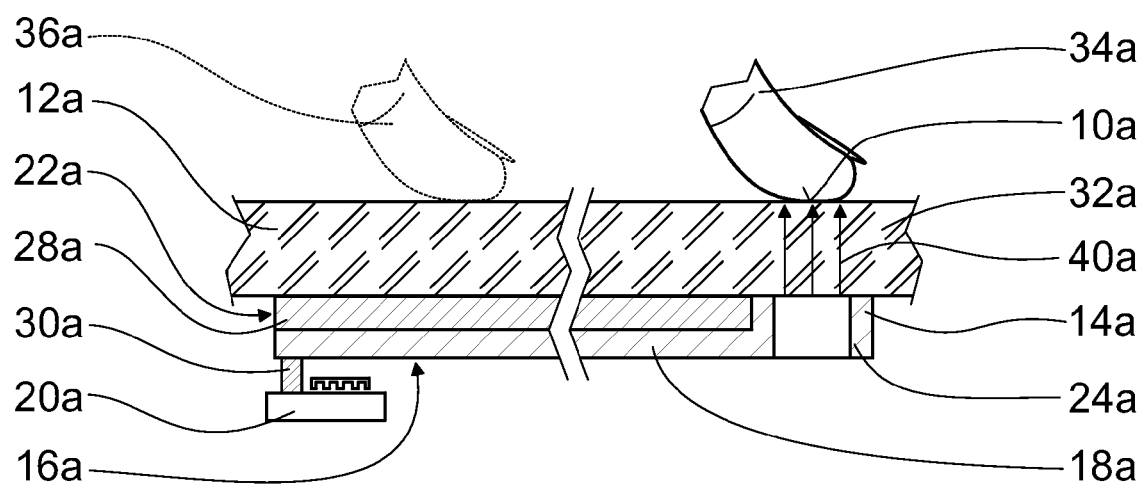

FIG. 2 shows a cross-section which is not to scale through the domestic-appliance-operating device along a line II-II in FIG. 1. The screening unit 22a comprises a dielectric element 28a which is designed to electrically shield a conducting element 18a. To this end the dielectric element 28a is arranged in the vicinity of the conducting element 18a between the operating panel 12a and the conducting element 18a. The sensor plate 14 and the conducting element 18a are applied in one piece in a silk screen process as an electrically conductive coating 24a to an underside of the operating panel 12a facing the top side. The dielectric element 28a is a ceramic coating applied in a silk screen process of the operating panel 12a with a greater dielectric constant than the operating panel 12a. In producing the domestic-appliance-operating device, first the dielectric element 28a is coated on the underside of the operating panel 12a. After that the electrically conductive coating 24a which forms the sensor plate 14a and the conducting element 18a is applied. The dielectric element 28a attenuates an electrical field originating from the conducting element 18a in the vicinity of the conducting element 18a in the direction of the operating panel 12a. When the operating panel 12a is touched with a finger 36a in an area above the conducting element 18a, this results in only a slight influencing of the electrical field which is overridden by the touch sensor unit 20a. When the operating panel 12a is touched in the area of the touch operating surface 10a, on the other hand, this results in major influencing of the electrical field 40a originating from the sensor plate 14a. The touch sensor unit 20a registers activation of the touch operating surface 10a.

Figure 3:
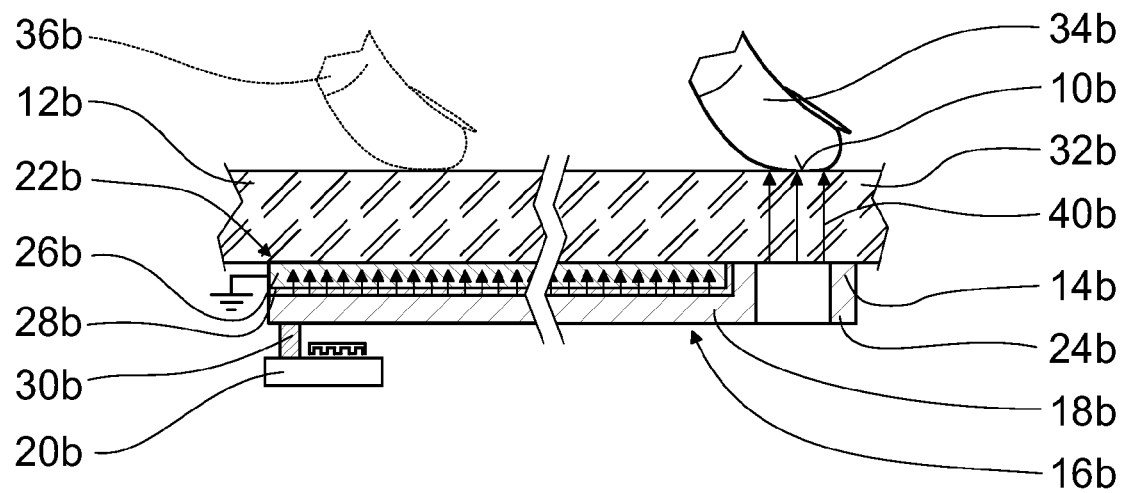
Figure 4A:
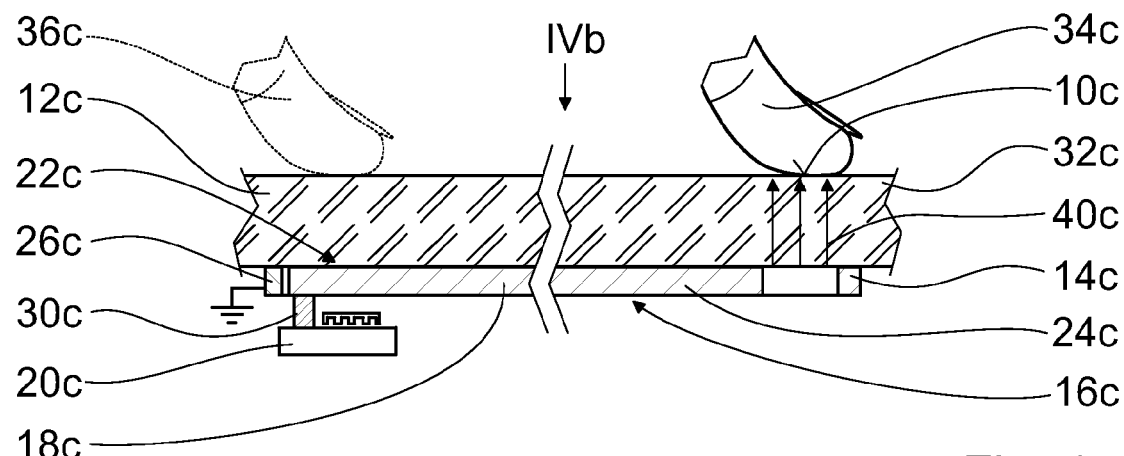
Figure 4B:
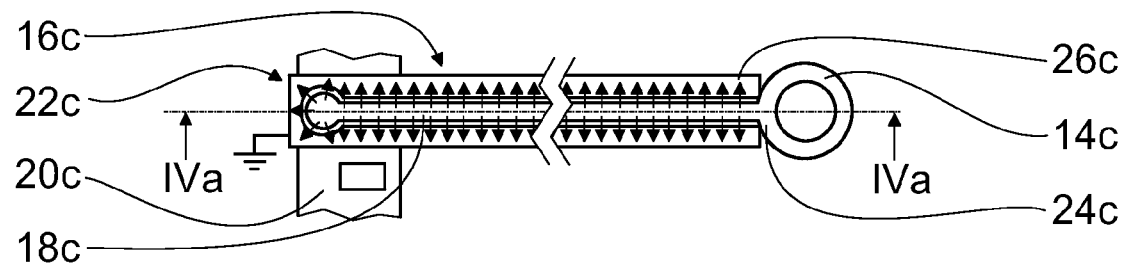

FIGS. 3, 4a and 4b show two further exemplary embodiments of a domestic-appliance-operating device according to the invention. The following descriptions and the drawings are essentially limited to the differences between the exemplary embodiments, wherein with regard to components with the same designations, in particular with regard to components with the same reference characters, in principle reference may also be made to the drawings and/or the descriptions of the other exemplary embodiments, in particular of FIGS. 1 and 2. To distinguish the exemplary embodiments, the letters "a", "b" and "c" are appended to the reference characters of the exemplary embodiments.

FIG. 3 shows a cross-section which is not to scale through a domestic-appliance-operating device with a preferred embodiment of a screening unit 22b. The screening unit 22b comprises an electrically conductive element 26b, connected to a reference voltage terminal, which is designed to shield an electrical field of the conducting element 18b. The reference voltage terminal is a protective earth terminal of the glass ceramic hob. The electrically conductive element 26b is arranged between an operating panel 12b and a conducting element 18b. A dielectric element 28b is arranged between the conducting element 18b and the electrically conductive element 26b for electrical insulation. A sensor plate 14b and the conducting element 18b are applied in one piece to an underside of the operating panel 12b as an electrically conductive coating 24b in a silk screen process. The electrically conductive element 26b is a coating identical to the conductive coating 24b. The dielectric element 28b is a ceramic coating applied in a silk screen process. In producing the domestic-appliance-operating device, first the electrically conductive element 26b is applied to the underside of the operating panel 12b in a silk screen process. After that the dielectric element 28b is applied via the electrically conductive element 26b in a silk screen process. Finally, the conductive coating 24b, which forms the sensor plate 14b and the conducting element 18b, is applied to the operating panel 12b and the dielectric element 28b. The electrically conductive element 26b shields an electrical field originating from the conducting element 18b in the vicinity of the conducting element 18b in the direction of the operating panel 12b. When the operating panel 12b is touched with a finger 36b in an area above the conducting element 18b, this results in only a slight influencing of the electrical field which is overridden by a touch sensor unit 20b. When the operating panel 12b is touched in the area of a touch operating surface 10b, on the other hand, this results in major influencing of the electrical field 40b originating from the sensor plate 14b. The touch sensor unit 20b registers activation of the touch operating surface 10b. In an alternative embodiment the coating forming the electrically conductive element 26b may also have recesses and in particular, be designed as a lattice structure. Material can be saved as a result of this.

FIG. 4a shows a cross-section which is not true to scale through a domestic-appliance-operating device with a particularly preferred embodiment of a screening unit 22c. The screening unit 22c comprises an electrically conductive element 26c connected to a reference voltage terminal, and is provided to shield an electrical field of a conducting element 18c. The reference voltage terminal is a protective earth terminal of the glass ceramic hob. The electrically conductive element 26c is arranged in a parallel direction to an operating panel 12c on the side adjacent to a conducting element 18c. FIG. 4b illustrates this in a plan view of the domestic-appliance-operating device which is not true to scale, wherein the operating panel 12c is not shown in order to provide a better overview. The electrically conductive element 26c comprises the conducting element 18c almost completely with the exception of one recess in the vicinity of the sensor plate 14c. The electrically conductive element 26c and the conducting element 18c are electrically insulated from each other by the smallest spacing possible. A sensor plate 14c and the conducting element 18c are applied in one piece as an electrically conductive coating 24c to an underside of the operating panel 12c in a silk screen process. The electrically conductive element 26c is an identical coating to the conductive coating 24c. In producing the domestic-appliance-operating device, the conductive coating 24c and the electrically conductive element 26c are applied in one step. Application of the conductive coating 24c and the electrically conductive element 26c takes place in a silk screen process. Alternatively, however, it is also conceivable to apply the conductive coating 24c and the electrically conductive element 26c by means of a cathode sputtering method. It is recommended in this case that the conductive coating 24c and the electrically conductive element 26c are applied to the underside of the operating panel 12c as a continuous surface and then a spatial separation of the conductive coating 24c and of the electrically conductive element 26c is undertaken by means of a laser ablation method. The electrically conductive element 26c shields an electrical field originating from the conducting element 18c in the vicinity of the conducting element 18c in the direction of the operating panel 12c. When the operating panel 12c is touched with a finger 36c in an area above the conducting element 18c, this results in only a slight influencing of the electrical field which is overridden by a touch sensor unit 20c. When the operating panel 12c is touched in the area of a touch operating surface 10c, on the other hand, this results in major influencing of an electrical field 40c originating from the sensor plate 14c. The touch sensor unit 20c registers an activation of the touch operating surface 10c.

| Reference characters | |
|---|---|
| 10a | Touch operating surface |
| 10b | Touch operating surface |
| 10c | Touch operating surface |
| 12a | Operating panel |
| 12b | Operating panel |
| 12c | Operating panel |
| 14a | Sensor plate |
| 14b | Sensor plate |
| 14c | Sensor plate |
| 16a | Signal-transmission unit |
| 16b | Signal-transmission unit |
| 16c | Signal-transmission unit |
| 18a | Conducting element |
| 18b | Conducting element |
| 18c | Conducting element |
| 20a | Touch sensor unit |
| 20b | Touch sensor unit |
| 20c | Touch sensor unit |
| 22a | Screening unit |
| 22b | Screening unit |
| 22c | Screening unit |
| 24a | Conductive coating |
| 24b | Conductive coating |
| 24c | Conductive coating |
| 26b | Electrically conductive element |
| 26c | Electrically conductive element |
| 28a | Dielectric element |
| 28b | Dielectric element |
| 30a | Spring element |
| 30b | Spring element |
| 30c | Spring element |
| 32a | Hob plate |
| 32b | Hob plate |
| 32c | Hob plate |
| 34a | Finger |
| 34b | Finger |
| 34c | Finger |
| 36a | Finger |
| 36b | Finger |
| 36c | Finger |
| 38a | Cooking zone |
| 40a | Electrical field |
| 40b | Electrical field |
| 40c | Electrical field |

The invention claimed is:

1. A domestic-appliance-operating device, comprising:
   an operating panel having a touch operating surface;
   a sensor plate arranged beneath the touch operating surface;
   a touch sensor unit, wherein the sensor plate and the touch sensor unit are arranged in spaced-apart relationship on a plane parallel to the operating panel; and
   a signal-transmission unit extending in a direction of the plane parallel to the operating unit and connecting the sensor plate to the touch sensor unit in an electrically conductive manner by a conducting element, said signal-transmission unit having at least one screening unit.

2. The domestic-appliance-operating device of claim 1, constructed in the form of a hob-operating device.

3. The domestic-appliance-operating device of claim 1, wherein the sensor plate and the conducting element are formed in one piece as a conductive coating on the operating panel.

4. The domestic-appliance-operating device of claim 1, wherein the screening unit comprises at least one electrically conductive element, connected to a reference voltage terminal, which is provided to shield an electrical field of the conducting element.

5. The domestic-appliance-operating device of claim 4, wherein the reference voltage terminal is an earth terminal.

6. The domestic-appliance-operating device of claim 4, wherein the electrically conductive element is arranged at least partially on a side adjacent to the conducting element in a parallel direction to the touch operating surface.

7. The domestic-appliance-operating device of claim 4, wherein the electrically conductive element is arranged at least partially between the operating panel and the conducting element.

8. The domestic-appliance-operating device of claim 1, wherein the screening unit comprises at least one dielectric element which is provided to electrically shield the conducting element.

9. The domestic-appliance-operating device of claim 8, wherein the dielectric element is arranged at least partially between the operating panel and the conducting element.

10. The domestic-appliance-operating device of claim 1, wherein the signal-transmission unit comprises a spring element which is provided to connect the conducting element to the touch sensor unit in an electrically conductive manner.

11. The domestic-appliance-operating device of claim 1, wherein the sensor plate includes a conductive coating on an underside the operating panel, and
    wherein the conducting element of the signal-transmission unit includes a conductive coating on the underside the operating panel that extends in the direction of the plane parallel to the operating unit and connects the conductive coating of the sensor plate to the touch sensor unit.

12. The domestic-appliance-operating device of claim 11, wherein the touch sensor unit is spaced apart from the operating panel in a vertical direction.

13. A domestic appliance, comprising a domestic-appliance-operating device including an operating panel having a touch operating surface, a sensor plate arranged beneath the touch operating surface, a touch sensor unit, wherein the sensor plate and the touch sensor unit are arranged in spaced-apart relationship on a plane parallel to the operating panel, and a signal-transmission unit extending in a direction of the plane parallel to the operating unit and connecting the sensor plate to the touch sensor unit in an electrically conductive manner by a conducting element, said signal-transmission unit having at least one screening unit.

14. The domestic appliance of claim 13, constructed in the form of a glass ceramic hob.

15. The domestic appliance of claim 13, wherein the domestic-appliance-operating device is a hob-operating device.

16. The domestic appliance of claim 13, wherein the sensor plate and the conducting element are formed in one piece as a conductive coating on the operating panel.

17. The domestic appliance of claim 13, wherein the screening unit comprises at least one electrically conductive element, connected to a reference voltage terminal, which is provided to shield an electrical field of the conducting element.

18. The domestic appliance of claim 17, wherein the reference voltage terminal is an earth terminal.

19. The domestic appliance of claim 17, wherein the electrically conductive element is arranged at least partially on a side adjacent to the conducting element in a parallel direction to the touch operating surface.

20. The domestic appliance of claim 17, wherein the electrically conductive element is arranged at least partially between the operating panel and the conducting element.

21. The domestic appliance of claim 13, wherein the screening unit comprises at least one dielectric element which is provided to electrically shield the conducting element.

22. The domestic appliance of claim 21, wherein the dielectric element is arranged at least partially between the operating panel and the conducting element.

23. The domestic appliance of claim 13, wherein the signal-transmission unit comprises a spring element which is provided to connect the conducting element to the touch sensor unit in an electrically conductive manner.

24. The domestic appliance of claim 13, wherein the sensor plate includes a conductive coating on an underside the operating panel, and
wherein the conducting element of the signal-transmission unit includes a conductive coating on the underside the operating panel that extends in the direction of the plane parallel to the operating unit and connects the conductive coating of the sensor plate to the touch sensor unit.

25. The domestic appliance of claim 24, wherein the touch sensor unit is spaced apart from the operating panel in a vertical direction.

* * * * *